US008624556B2

(12) United States Patent
Lupienski et al.

(10) Patent No.: US 8,624,556 B2
(45) Date of Patent: Jan. 7, 2014

(54) BATTERY SECTION/MODULE AUTOMATIC CELL BALANCER REPAIR TOOL

(75) Inventors: Jason A. Lupienski, Pittsford, NY (US); Robert R. Brummond, Honeoye Falls, NY (US); Robert W. Chalfant, Farmington, NY (US); Garry L. Voytovich, Conesus, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 468 days.

(21) Appl. No.: 12/945,578

(22) Filed: Nov. 12, 2010

(65) Prior Publication Data

US 2012/0105005 A1 May 3, 2012

Related U.S. Application Data

(60) Provisional application No. 61/408,482, filed on Oct. 29, 2010.

(51) Int. Cl.
*H02J 7/00* (2006.01)
(52) U.S. Cl.
USPC .......................................... 320/119; 320/116
(58) Field of Classification Search
USPC ......................................................... 320/119
See application file for complete search history.

(56) References Cited

U.S. PATENT DOCUMENTS

| 5,498,950 | A | * | 3/1996 | Ouwerkerk | 320/119 |
| 2007/0075681 | A1 | * | 4/2007 | Takagi et al. | 320/128 |
| 2009/0001937 | A1 | * | 1/2009 | Densham et al. | 320/145 |

\* cited by examiner

*Primary Examiner* — Drew A Dunn
*Assistant Examiner* — Robert Grant
(74) *Attorney, Agent, or Firm* — John A. Miller; Miller IP Group, PLC

(57) ABSTRACT

A portable cell balancing repair tool for correcting cell-to-cell voltage imbalances. The tool defines a voltage set-point that identifies a desired voltage that the cells will be charged to for the cell-to-cell voltage balancing. The tool selects a cell to be balanced, measures the voltage of the selected cell and determines if the measured voltage is less than the voltage set-point. The tool charges the selected cell with a charging current for a predetermined period of time, and then determines if the voltage of the selected cell is greater than the voltage set-point after the time expires. The tool continues charging the selected cell at the charging current if the measured voltage is not greater than the voltage set-point, and determines if the charging current was at the minimum charging current if the measured voltage of the selected cell is greater than the voltage set-point.

20 Claims, 2 Drawing Sheets

BATTERY SECTION/MODULE AUTOMATIC CELL BALANCER REPAIR TOOL

CROSS-REFERENCE TO RELATED APPLICATIONS

This application claims the benefit of the priority date of U.S. Provisional Patent Application Ser. No. 61/408,482, titled Battery Section/Module Automatic Cell Balancer Repair Tool, filed Oct. 29, 2010.

BACKGROUND OF THE INVENTION

1. Field of the Invention

This invention relates generally to a portable cell balancing repair tool for correcting cell-to-cell voltage imbalances within a battery pack and, more particularly, to an automatic and portable cell balancing repair tool for correcting cell-to-cell voltage imbalances within a battery pack that charges individual cells to a common voltage set-point.

2. Discussion of the Related Art

Electric vehicles are becoming more and more prevalent. These vehicles include hybrid vehicles, such as the extended range electric vehicles (EREV) that combine a battery and a main power source, such as an internal combustion engine, fuel cell systems, etc., and electric only vehicles, such as the battery electric vehicles (BEV). All of these types of electric vehicles employ a high voltage battery that includes a number of battery cells. These batteries can be different battery types, such as lithium ion, nickel metal hydride, lead acid, etc. A typical high voltage battery system for an electric vehicle may include a large number of battery cells or modules including several battery cells to meet the vehicle power and energy requirements. The battery system can include individual battery modules where each battery module may include a certain number of battery cells, such as twelve cells. The individual battery cells may be electrically coupled in series, or a series of cells may be electrically coupled in parallel, where a number of cells in the module are connected in series and each module is electrically coupled to the other modules in parallel. Different vehicle designs include different battery designs that employ various trade-offs and advantages for a particular application.

When a battery pack for a vehicle is being manufactured, individual battery cells are typically combined as groups of cells, which may include three cells, and groups of cells are welded together to form a battery module. The battery modules are electrically coupled together within a housing to provide the battery pack where the number of modules determines the battery pack voltage. During the manufacturing process, battery packs and battery cell sections are electrically charged and discharged to identify battery pack build and cell issues and failures. These failure modes found at the electrical test of the battery pack can cause individual cells or cell groups to become out of balance. A cell out of balance condition is where cells within the battery pack or section are at different states-of-charge (SOC). There are various reasons why the individual cells or cell groups may be out of balance. For example, a defective voltage temperature sense monitoring (VTSM) harness may cause poor connections to the battery pack. This may result in poor cell-to-cell voltage balancing where if the cell voltage imbalance is large enough, the performance of the battery pack is affected, where the drive distance of the vehicle is reduced at the battery beginning of life. Cells are considered to be too out of balance with each other when the section or battery pack open circuit voltage range is greater than the battery build process specification for a particular battery configuration.

When a battery pack is tested and the charge of a cell or cell group is identified as being too low, which causes a cell-to-cell voltage imbalance, then affirmative steps need to be taken to correct the imbalance. There are known methods for raw battery cell-to-cell voltage balancing in a manufacturing repair environment using a power supply and a resistor to manually repair a battery section or module that is out of balance. However, these known methods of manually repairing a battery section or module have typically been burdensome, ineffective and unsafe. What typically happens is that if a low charge cell is found in a cell group, then the entire module that is welded together is discarded and replaced, which has obvious cost implications because most of the cells in the module may be operating properly. Currently, there is no automatic battery balancing repair tool that can be purchased off the shelf.

SUMMARY OF THE INVENTION

In accordance with the teachings of the present invention, a portable cell balancing repair tool for correcting cell-to-cell voltage imbalances is disclosed. The tool defines a voltage set-point that identifies a desired voltage that the cells will be charged to for the cell-to-cell voltage balancing. The tool selects a cell to be balanced, measures the voltage of the selected cell and determines if the measured voltage is less than the voltage set-point. The tool then determines if the measured voltage of the selected cell is within a predetermined threshold of the voltage set-point if the measured voltage of the selected cell is less than the voltage set-point. The tool provides a maximum charging current for charging the selected cell if the measured voltage of the selected cell is outside of the threshold and a minimum charging current for charging the selected cell if the measured voltage of the selected cell is within the threshold. The tool charges the selected cell with the maximum charging current or the minimum charging current for a predetermined period of time, and then determines if the voltage of the selected cell is greater than the voltage set-point after the time expires. The tool continues charging the selected cell at the maximum charging current or the minimum charging current if the measured voltage is not greater than the voltage set-point, and determines if the charging current was at the minimum charging current if the measured voltage of the selected cell is greater than the voltage set-point. The tool reduces the charging current of the selected cell by a predetermined amount if the charging current was not at the minimum charging current if the measured voltage of the selected cell is greater than the voltage set-point, and selects a next cell to be balanced if the charging current of the select cell was at the minimum charging current.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a repair tool for providing cell-to-cell voltage balancing for a battery pack at the manufacturing level is merely exemplary in a nature, and is in no way intended to limit the invention or its applications or uses. For example, the repair tool described below is for a high voltage vehicle battery. However, as will be appreciated by those skilled in the art, the cell-to-cell voltage balancing repair tool of the invention may have application for other batteries that require cell balancing.

Figure 1:
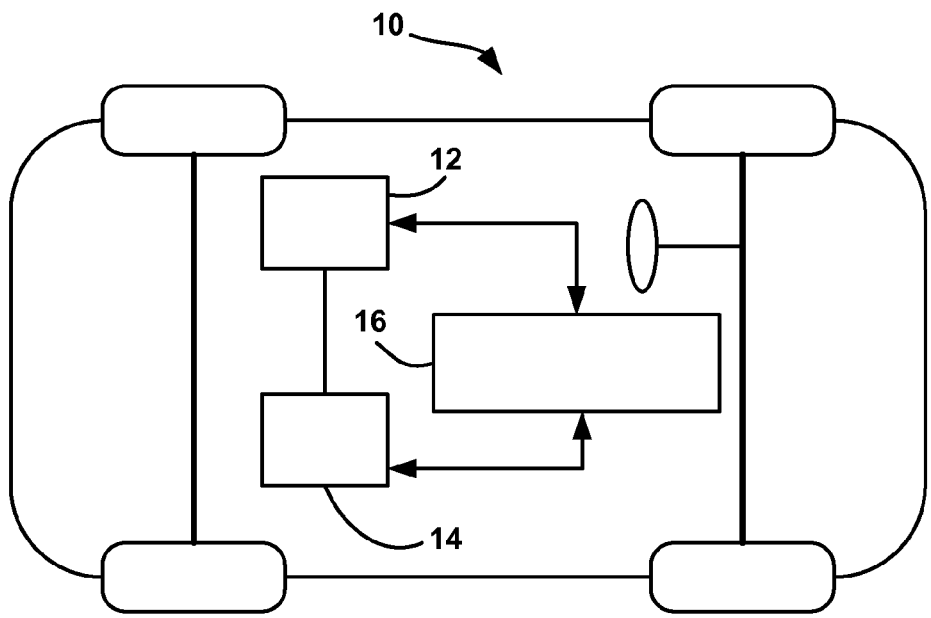
FIG. 1 is a top plan view of a vehicle including a vehicle battery.

FIG. 1 is a top plan view of a vehicle 10 intended to represent an electric vehicle or an electric hybrid vehicle. The vehicle 10 includes a high voltage battery 12 mounted to a suitable support within the vehicle 10, where the battery 12 includes a plurality of battery cells. The battery 12 can be any battery suitable for an electric vehicle, such as a lead-acid battery, lithium-ion battery, metal hydride battery, etc. The vehicle 10 may also include a separate power source 14, such as an internal combustion engine, fuel cell system, etc. A controller 16 controls the operation of the battery 12 and the power source 14 including the power distribution therebetween.

The present invention proposes a device or repair tool that is able to charge individual battery cells or groups of battery cells while the battery pack is connected to an interconnect board at the manufacturing level of the battery pack. The device is portable in that it is provided in an enclosure and able to be easily carried from place to place. The repair tool is automatic in that once it is initiated it will automatically balance all of the cells in the battery pack within a battery section, and does not need to be attended by a technician.

Figure 2:
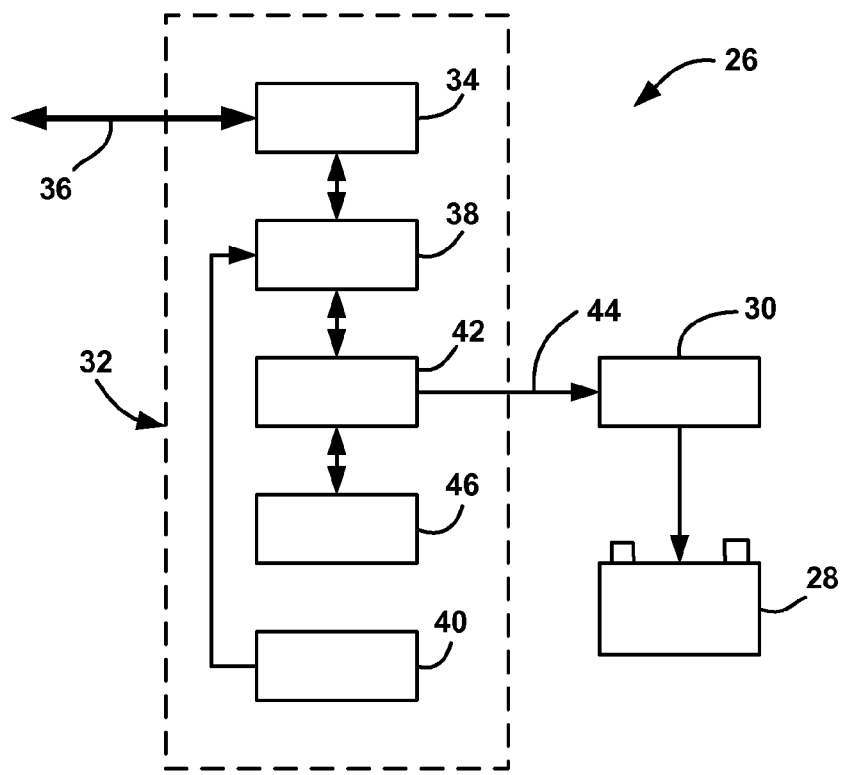
FIG. 2 is a block diagram of a portable cell balancing repair tool.

FIG. 2 is a schematic block diagram of a battery charging and cell balancing repair tool 26 of the type referred to above for charging a battery 28 having many battery cells. The tool 26 assesses the battery 28 for cell-to-cell voltage balance and provides subsequent cell charging, if necessary, through an interconnect board that is coupled on top of the battery 28 to provide the main charging of the battery 28 when it is being manufactured. Thus, the interconnect board offers a safe connection scheme where the user does not need to be exposed to live battery cell tabs within the battery 28.

The repair tool 26 includes an outer housing or enclosure 32 that allows the tool 26 to be portable and to be carried from location to location. The repair tool 26 includes a charge balancer controller 34 that is in communication with the Ethernet on line 36. The charge balancer controller 34 provides the various control functions of the tool 26 for properly charging the individual battery cells consistent with the discussion herein. The controller 34 is in communication with analog discrete input/output (I/O) controls 38 powered by a power supply 40. A multiplexer printed circuit board 42 is coupled to the I/O controls 38 and provides the selection of a particular battery cell or group to be charged on line 44 through the interconnect board coupled to the battery 28. A data acquisition processor 46 stores the various measured voltages and cell temperatures.

Figure 3:
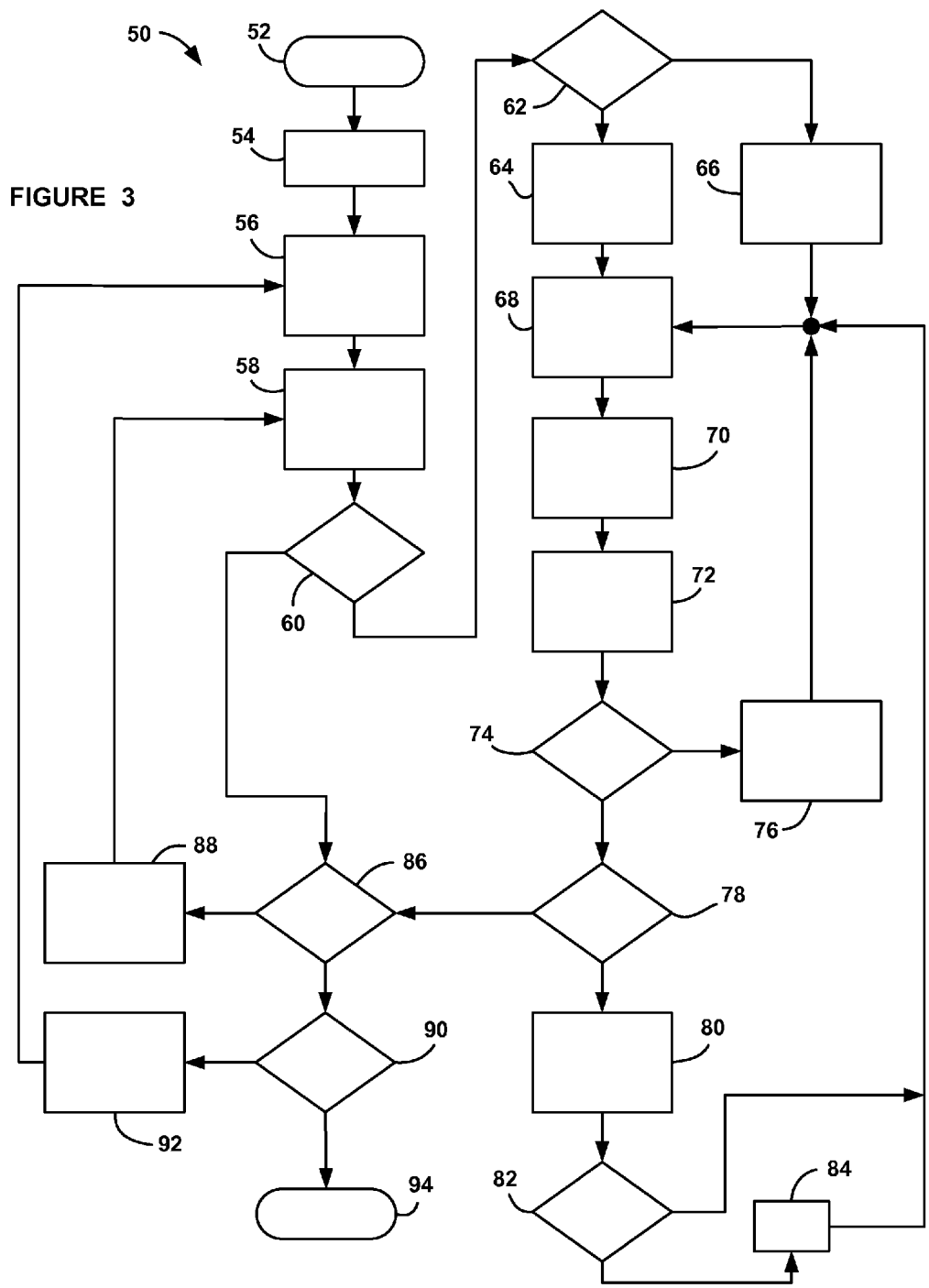
FIG. 3 is a flow chart diagram for an algorithm for providing cell-to-cell balancing in the repair tool shown in FIG. 2.

FIG. 3 is a flow chart diagram 50 showing a process for operating an algorithm in the tool 26 shown in FIG. 2 to charge the individual battery cells or cell groups in the battery 28. The algorithm starts at box 52, and defines a voltage set-point at box 54 identifying the voltage that is the charge for the cells to be balanced to. The present discussion only includes charging of the battery cells to meet the voltage set-point for the cell balancing. However, in some situations the particular cell may be above the voltage set-point, where provisions can be made for reducing the charge of those cells.

Once the voltage set-point has been defined, the algorithm selects the first cell to be tested at box 56, and measures the voltage of the selected cell at box 58. The algorithm determines whether the measured voltage of the selected cell is greater than the voltage set-point at decision diamond 60, and if not, determines whether the measured voltage of the cell is within a predetermined threshold of the set-point at decision diamond 62. The algorithm wants to know how close the measured voltage of the selected cell is to the voltage set-point so it can determine how much current to provide to charge the cell, where the closer the voltage is to the set-point, the lower the charging current. For example, if the measured voltage of the selected cell is within the threshold, then the initial charging current may be a trickle charge of about 2 amps. However, if the measured voltage to the selected cell is outside of the threshold, then the algorithm may provide maximum charging of about 8 amps.

If the cell voltage is not within the threshold of the set-point at the decision diamond 62, then the algorithm sets the charging current to its maximum at box 64, and if the cell voltage is within the threshold of the set-point at the decision diamond 62, the algorithm sets the charging current to a minimum level at box 66. The algorithm then closes the charging contacts at box 68, and waits a predetermined period of time at box 70, such as 15 seconds, while the cell is being charged. After the time period has expired, the algorithm turns off the charging current and opens the charging contacts at box 72, and determines whether the cell voltage is greater than the voltage set-point at decision diamond 74. If the cell charge is not greater than the voltage set-point at the decision diamond 74, then the cell needs more charging, and the same amount of charging current is provided at box 76, where the algorithm returns to the box 68 to close the charging contacts for another predetermined time period of charging.

If the cell voltage is greater than the voltage set-point at the decision diamond 74, the algorithm determines whether the last charging current for this selected cell is at the minimum charging current at decision diamond 78. When the cell is charged at a higher charging current than the minimum trickle charge current, the charging current is systematically decreased over time until the cell is fully charged. If the charging current was not at the minimum current at the decision diamond 78, then the algorithm reduces the amount of charging current one step from that being used to charge the cell at box 80. The algorithm then determines whether the charging current is less than the minimum current setting at the decision diamond 82, and if not, returns to the box 68 to charge the selected cell at the new charging current. If, however, the current is less than the minimum current setting at the decision diamond 82, the algorithm sets the charging current to the minimum current at box 84, and then again returns to the box 68 to close the contacts and provide further cell charging at the minimum charging current.

If the cell was being charged at the minimum charging current at the decision diamond 78, the algorithm determines whether the last cell in the battery pack has been charged at decision diamond 86, and if not, the algorithm increments to the next cell at box 88, and returns to the box 58 to measure the voltage of the next cell. Also, if the selected cell voltage is greater than the set-point at the decision diamond 60, the algorithm proceeds directly to the decision diamond 86 to determine if the last cell has been charged. If the last cell has been charged at the decision diamond 86, then the algorithm determines whether the charging has gone through all of the predetermined iterations at decision diamond 90. In other words, all of the cells are measured and charged, if necessary, a number of times (iterations) where all of the cells are measured and possibly charged during one iteration before the first cell is again measured for the next iteration. This iteration process makes the charging more accurate to the voltage set-point because the charge of the cells may be decay somewhat during the balancing process. In one non-limiting embodiment, the cells go through three iterations. If all of the iterations have not been gone through for all of the cells at the decision diamond 90, then the algorithm increments the iteration count at box 92 and returns to the box 56 to select the first cell for the next iteration. Otherwise, the algorithm finishes at box 94.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing cell-to-cell balancing for the voltage of battery cells in a battery pack, said method comprising:
   defining a voltage set-point that identifies a desired cell voltage that provides the cell-to-cell balancing;
   selecting a cell to be balanced;
   measuring the voltage of the selected cell;
   determining if the measured voltage of the selected cell is less than the voltage set-point;
   determining if the measured voltage of the selected cell is within a predetermined threshold of the voltage set-point if the measured voltage of the selected cell is less than the voltage set-point;
   providing a maximum charging current for charging the selected cell if the measured voltage of the selected cell is outside of the threshold;
   providing a minimum charging current for charging the selected cell if the measured voltage of the selected cell is within the threshold;
   charging the selected cell with the maximum charging current or the minimum charging current for a predetermined period of time;
   determining if the voltage of the selected cell is greater than the voltage set-point after the predetermined period of time;
   continuing charging the selected cell at the maximum charging current or the minimum charging current if the measured voltage is not greater than the voltage set-point;
   determining if the charging current was at the minimum charging current if the measured voltage of the selected cell is greater than the voltage set-point;
   reducing the charging current for the selected cell by a predetermined amount if the charging current was not at the minimum charging current if the measured voltage of the selected cell is greater than the voltage set-point; and
   selecting a next cell to be balanced if the charging current of the selected cell was at the minimum charging current.

2. The method according to claim 1 further comprising determining if the charging current of the selected cell is less than the minimum charging current after the charging current of the selected cell is reduced if the charging current is not at the minimum charging current, and setting the charging current to the minimum charging current if the charging current is less than the minimum charging current.

3. The method according to claim 1 further comprising repeatedly charging the selected cell, determining if the voltage of the selected cell is greater than the voltage set-point after the predetermined period of time, and decreasing the charging current if the charging current is not at the minimum charging current if the voltage of the selected cell is greater than the voltage set-point.

4. The method according to claim 1 further comprising performing steps for balancing all of the cells in the battery pack one after another and then again balancing all of the cells in the battery pack for a plurality of iterations.

5. The method according to claim 4 where the plurality of iterations is three iterations.

6. The method according to claim 1 wherein the maximum charging current is 8 amps and the minimum charging current is 2 amps.

7. The method according to claim 1 wherein the battery pack is a high voltage battery pack for an electric vehicle.

8. The method according to claim 1 wherein reducing the charging current of the selected cell by a predetermined amount if the charging current is not at the minimum charging current includes reducing the charging current in increments of 2 amps.

9. The method according to claim 1 wherein charging the selected cell for a predetermined period of time includes charging the selected cell for about 15 seconds.

10. A method for providing cell-to-cell balancing for the voltage of battery cells in a battery pack, said method comprising:
    defining a voltage set-point that identifies a desired cell voltage that provides the cell-to-cell balance;
    selecting a cell to be balanced;
    measuring the voltage of the selected cell;
    determining if the measured voltage of the selected cell is less than the voltage set-point;
    determining if the measured voltage of the selected cell is within a predetermined threshold of the voltage set-point if the measured voltage of the selected cell is less than the voltage set-point;
    providing a maximum charging current for charging the selected cell if the measured voltage of the selected cell is outside of a predetermined threshold;
    providing a minimum charging current for charging the selected cell if the measured voltage of the selected cell is within the threshold;
    charging the selected cell with the maximum charging current or the minimum charging current for a predetermined period of time;
    determining if the voltage of the selected cell is greater than the voltage set-point after the predetermined period of time;
    continuing charging the selected cell at the charging current if the measured voltage is not greater than the voltage set-point;
    determining if the charging current was at a minimum charging current if the voltage of the selected cell is greater than the voltage set-point;
    reducing the charging current for the selected cell by a predetermined amount if the charging current was not at the minimum charging current if the measured voltage of the selected cell is greater than the voltage set-point.

11. The method according to claim 10 further comprising determining if the measured voltage of the selected cell is within a predetermined threshold of the voltage set-point if the measured voltage of the selected cell is less than the voltage set-point, and providing a maximum charging current for charging the selected cell if the measured voltage of the selected cell is outside of the threshold and providing a minimum charging current for charging the selected cell if the measured voltage of the selected cell is within the threshold.

12. The method according to claim 10 further comprising determining if the charging current of the selected cell is less than a minimum charging current after the charging current of the selected cell is reduced if the charging current is not at the minimum charging current, and setting the charging current to the minimum charging current if the charging current is less than the minimum charging current.

13. The method according to claim 12 further comprising repeatedly charging the selected cell, determining if the voltage of the selected cell is greater than the voltage set-point after the predetermined period of time, and decreasing the charging current if the charging current is not at the minimum charging current if the voltage of the selected cell is greater than the voltage set-point.

14. The method according to claim 10 further comprising performing steps for balancing all of the cells in the battery pack one after another and then again balancing all of the cells in the battery pack for a plurality of iterations.

15. The method according to claim 10 wherein the battery pack is a high voltage battery pack for an electric vehicle.

16. A system for providing cell-to-cell balancing for the voltage of battery cells in a battery pack, said system comprising:
    means for defining a voltage set-point that identifies a desired cell voltage that provides the cell-to-cell balance;
    means for selecting a cell to be balanced;
    means for measuring the voltage of the selected cell;
    means for determining if the voltage of the selected cell is less than the voltage set-point;
    means for determining if the measured voltage of the selected cell is within a predetermined threshold of the voltage set-point if the measured voltage of the selected cell is less than the voltage set-point;
    means for providing a maximum charging current for charging the selected cell if the measured voltage of the selected cell is outside of a predetermined threshold;
    means for providing a minimum charging current for charging the selected cell if the measured voltage of the selected cell is within the threshold;
    means for charging the selected cell with the maximum charging current or the minimum charging current for a predetermined period of time;
    means for determining if the voltage of the selected cell is greater than the voltage set-point after the predetermined period of time;
    means for continuing charging the selected cell at the charging current if the measured voltage is not greater than the voltage set-point;
    means for determining if the charging current was at a minimum charging current if the voltage of the selected cell is greater than the voltage set-point;
    means for reducing the charging current for the selected cell by a predetermined amount if the charging current was not at the minimum charging current if the measured voltage of the selected cell is greater than the voltage set-point; and
    means for selecting a next cell to be balanced if the charging current of the selected cell was at the minimum charging current.

17. The system according to claim 16 further comprising means for determining if the measured voltage of the selected cell is within a predetermined threshold of the voltage set-point if the measured voltage of the selected cell is less than the voltage set-point, and means for providing a maximum charging current for charging the selected cell if the measured voltage of the selected cell is outside of the threshold and providing a minimum charging current for charging the selected cell if the measured voltage of the selected cell is within the threshold.

18. The system according to claim 16 further comprising means for determining if the charging current of the selected cell is less than a minimum charging current after the charging current of the selected cell is reduced if the charging current is not at the minimum charging current, and means for setting the charging current to the minimum charging current if the charging current is less than the minimum charging current.

19. The system according to claim 18 further comprising means for repeatedly charging the selected cell, determining if the voltage of the selected cell is greater than the voltage set-point after the predetermined period of time, and decreasing the charging current if the charging current is not at the minimum charging current if the voltage of the selected cell is greater than the voltage set-point.

20. The system according to claim 16 further comprising means for performing steps for balancing of the cells in the battery pack one after another and then balancing all of the cells in the battery pack for a plurality of iterations.

* * * * *